(No Model.) 2 Sheets—Sheet 1.

J. NOLAN.
POULTRY CAR.

No. 425,241. Patented Apr. 8, 1890.

Witnesses:
Geo. A. Gregg
J. Paul Mayer

Inventor:
James Nolan.
By Thos. S. Sprague & Son
Att'y:

(No Model.)  2 Sheets—Sheet 2.
J. NOLAN.
POULTRY CAR.
No. 425,241. Patented Apr. 8, 1890.
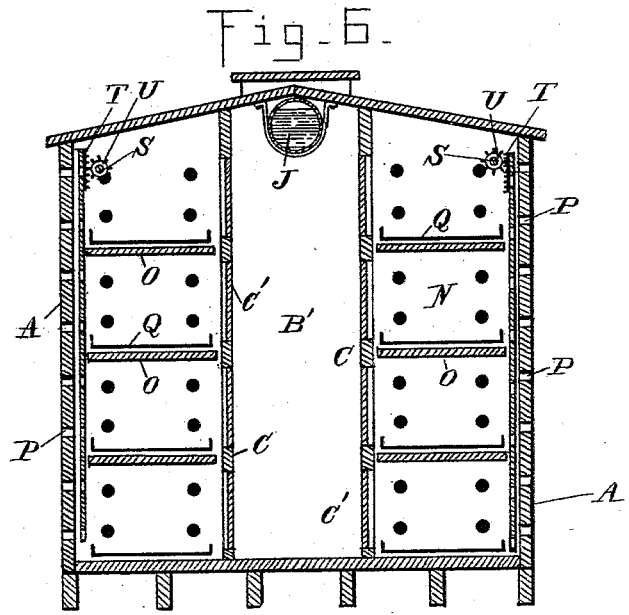
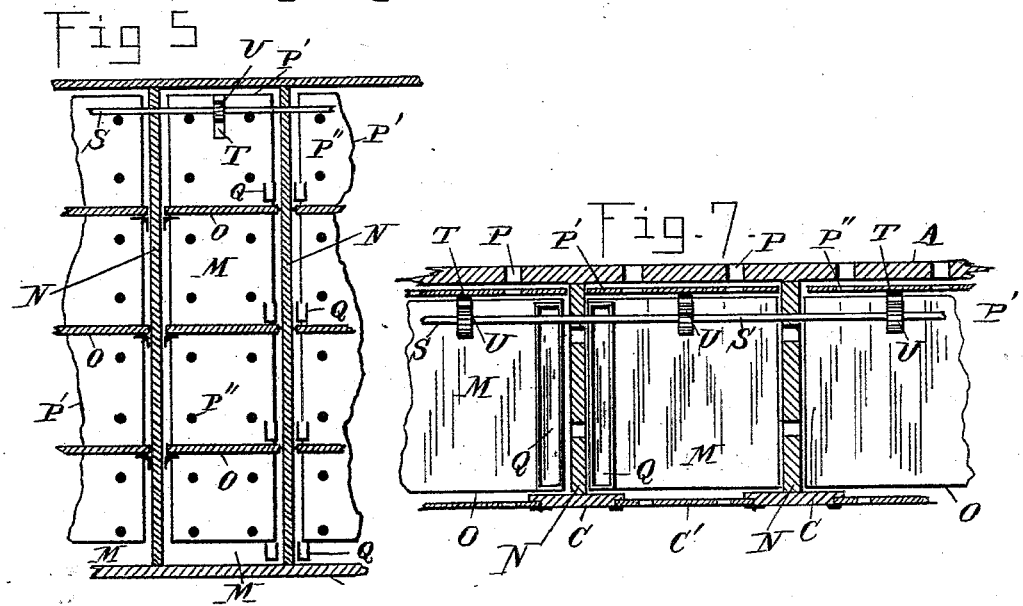
Witnesses:
Geo. A. Gregg.
J. Paul Mayer
Inventor:
James Nolan
By Thos. S. Sprague & Son
Atty:

UNITED STATES PATENT OFFICE.

JAMES NOLAN, OF DETROIT, MICHIGAN, ASSIGNOR TO NOLAN & CRAIG, OF SAME PLACE.

POULTRY-CAR.

SPECIFICATION forming part of Letters Patent No. 425,241, dated April 8, 1890.

Application filed March 6, 1889. Serial No. 302,086. (No model.)

*To all whom it may concern:*

Be it known that I, JAMES NOLAN, a citizen of the United States, residing at Detroit, in the county of Wayne and State of Michigan, have invented certain new and useful Improvements in Stock-Cars for Transporting Live Poultry, of which the following is a specification, reference being had therein to the accompanying drawings.

This invention relates to new and useful improvements in poultry-cars intended for the transportation by railway of all kinds of live poultry; and the invention consists in the peculiar construction, arrangement, and combination of different parts, whereby provision is made for conveniently housing a large number of live poultry in coops permanently provided for in the car, and for providing them with fresh air and for others attending to their comfort and wants while in transit, all as more fully hereinafter described, and shown in the accompanying drawings, in which—

Figure 1:
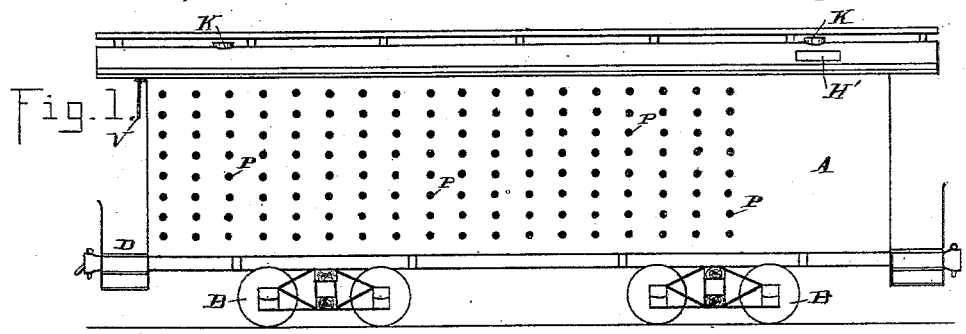
Figure 2:
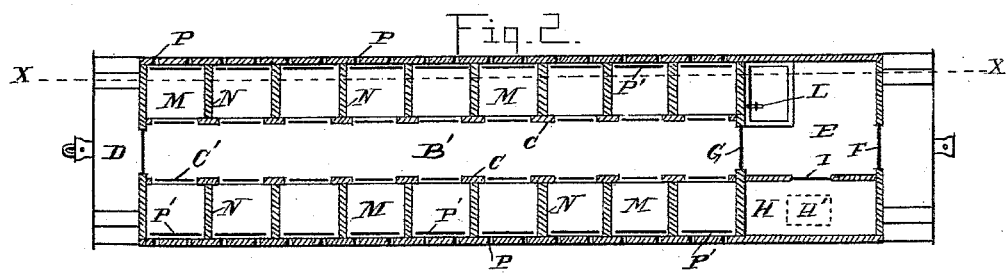
Figure 3:
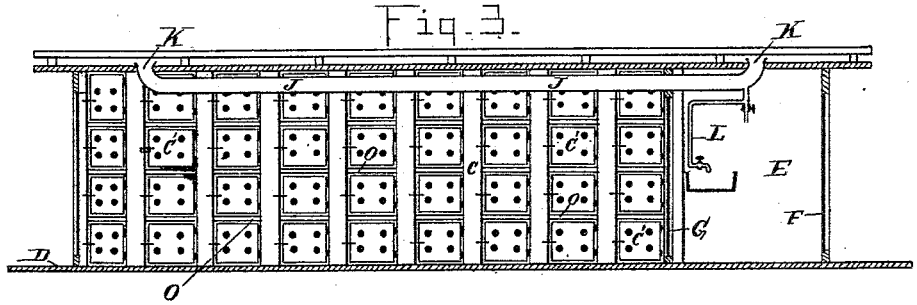
Figure 4:
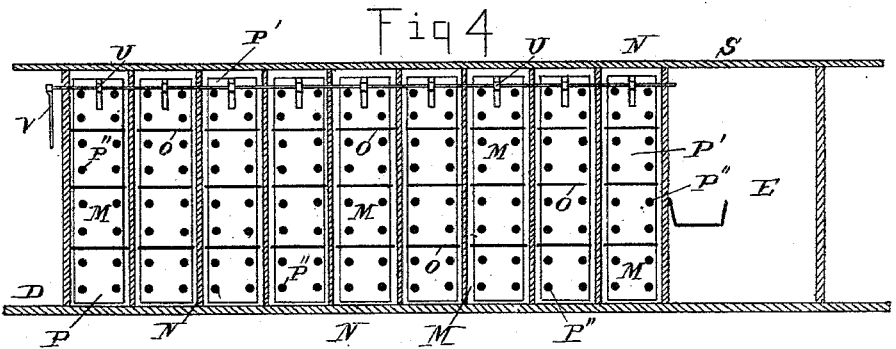

Figure 1 is a side elevation of my improved poultry-car. Fig. 2 is a diagram plan. Fig. 3 is a vertical longitudinal section of the car in diagram. Fig. 4 is a similar section through the coops on one side of the car in line X X in Fig. 2. Fig. 5 shows a portion of Fig. 4 enlarged. Fig. 6 is a cross-section of the car through the center of one tier of coops, and Fig. 7 is a plan of a portion of the car with the car-roof removed.

A is a car-body mounted on the usual trucks B and otherwise of known construction, except as hereinafter provided. The interior of the car is provided with a central aisle B', formed between two partitions C C, running longitudinally with the car. This aisle communicates at one end with the platform D of the car, and in the other end it communicates with a compartment E, which is provided with the usual door F, leading to the platform on this end of the car, and preferably with a door G between it and the aisle. In one portion of this compartment a bin H is formed for storing grain or other food adapted for the wants of the poultry, and this preferably extends to the roof of the car, where it is provided with a fill-opening provided with suitable cover H'. Access is had into this bin from the compartment E through a suitable door I.

Underneath the center of the roof and running in a longitudinal direction with the car, preferably from end to end thereof, is suspended a water-reservoir J, which is provided with a suitable fill opening or openings K through the roof of the car and which are suitably covered. This water-reservoir is preferably formed of a large-sized pipe and dips toward the compartment E, where it is provided with a suitable service-pipe L for drawing therefrom the water conveniently for watering the animals, there being also, preferably, a convenient nozzle provided for the attachment of a hose, by means of which it may be found easiest to carry the water to the individual coops. These coops M are formed between the longitudinal partition C and the respective sides of the car by vertical transverse partitions N, preferably spaced at equal distances apart in the remaining spaces in the car, and the sections thus formed are subdivided by the horizontal partitions O, which are either movably secured or hinged at one end, preferably to the partitions N. The coops are thus formed in tiers, preferably with four coops between the floor and the roof of the car. A suitable door C' is provided in the partitions C for access into each coop, and this door may be secured slidingly or be hinged or opened in any other suitable manner. Each coop is also provided with a suitable feed-trough Q, slidingly secured to be easily withdrawn through the partition C for the purpose of filling it with food or water. The object of making the partitions O removable or hinging them is for the convenience of cleaning each coop. If hinged, suitable catches are provided to secure the partitions in a horizontal position while in use, but allow of rapidly dumping the filth to the floor of the car.

For providing ample ventilation and breathing facilities and also light to the live poultry, which must necessarily be confined in small space, I make the following provision: Each vertical tier of coops is provided with one or more rows of apertures P through the sides of the car, and these are covered over on the inside with sliding covers P', provided with corresponding apertures P'', which can be made to register with the aperture P on the side walls, if desired. I preferably provide a mechanical device for jointly actuating all these covers—such as shown in the drawings—where horizontal shafts S are suitably journaled longitudinally with the car near the corner of the roof with the sides of the car. Each cover is then provided near its upper end with a rack T, which engages with a pinion U upon the shaft S. One end of these shafts is made to project through one end of the cover, and is provided with suitable levers V, by means of which the shafts may be conveniently actuated, and which may be locked in any adjustable position. Thus the attendant of the car by operating these levers can either close or open the apertures in the side walls of the car or adjust them to any desired degree for admitting air, as his judgment may devise. In addition to this provision, I also provide for the interior circulation of air through the car by providing the transverse partitions N with one or more rows of apertures similar to the side walls, and the doors to each coop I also form with perforations or apertures or construct them with screen or lattice work. Thus ample provision for a free circulation of air into and through the car is provided, and according to the direction of the wind or condition of the atmosphere the attendant may regulate the same to prevent discomfort or danger to the animals. The compartment E is preferably suitably equipped with a bunk and other conveniences necessary to the comfort of the attendant, and in winter may contain a stove to heat the interior of the car.

It is obvious that my improved car offers superior advantages to the present mode of carrying live poultry on railroad-cars to market, which consists, generally, in indiscriminately packing the coops with animals in ordinary freight-cars without any provision for feeding and watering, and which entails the loss of the coops to the farmers, as they are hardly worth being returned to them by the railroad. This mode of carrying them is hardly less than committing cruelty to animals, involving, besides, a large loss from death, starvation, or cold if the journey is prolonged.

What I claim as my invention is—

A stock-car consisting of the car-body having perforated sides, the perforated shutters adjacent to said sides, the racks, gears, and shafts for elevating and lowering said shutters, the side compartments formed of the side and end walls and drop-bottoms, the removable troughs in the side compartments, the water-supply pipe in the center of the car, and the end compartments, all arranged substantially as and for the purpose described.

In testimony whereof I affix my signature, in presence of two witnesses, this 29th day of January, 1889.

JAMES NOLAN.

Witnesses:
 JAMES W. WHITTEMORE,
 J. PAUL MAYER.